(12) United States Patent
Vonmetz et al.

(10) Patent No.: US 12,481,164 B2
(45) Date of Patent: Nov. 25, 2025

(54) PROJECTION OF LASER LIGHT SIGN WITH REDUCED DIFFRACTION PATTERN

(71) Applicant: Datalogic IP Tech S.R.L., Calderara di Reno (IT)

(72) Inventors: Kurt Vonmetz, Bologna (IT); Luigi Cini, Calderara di Reno (IT)

(73) Assignee: DATALOGIC IP TECH S.R.L., Calderara di Reno (IT)

( * ) Notice: Subject to any disclaimer, the term of this patent is extended or adjusted under 35 U.S.C. 154(b) by 71 days.

(21) Appl. No.: 18/628,345

(22) Filed: Apr. 5, 2024

(65) Prior Publication Data

US 2025/0314898 A1    Oct. 9, 2025

(51) Int. Cl.
  *G02B 27/09* (2006.01)
  *G06K 7/10* (2006.01)
  *H04N 23/56* (2023.01)

(52) U.S. Cl.
  CPC ..... *G02B 27/0916* (2013.01); *G02B 27/0955* (2013.01); *G02B 27/0988* (2013.01); *G06K 7/10732* (2013.01); *G06K 7/10831* (2013.01); *H04N 23/56* (2023.01)

(58) Field of Classification Search
  None
  See application file for complete search history.

(56) References Cited

U.S. PATENT DOCUMENTS

| | | | |
|---|---|---|---|
| 6,092,727 A | 7/2000 | Bogdan et al. | |
| 2016/0316127 A1* | 10/2016 | Rastegar | G02B 23/243 |
| 2017/0019575 A1* | 1/2017 | Dhadwal | G02B 23/2484 |
| 2019/0283180 A1 | 9/2019 | Banerjee | |

FOREIGN PATENT DOCUMENTS

| | | |
|---|---|---|
| EP | 1 128 315 A1 | 8/2001 |
| WO | WO-2019/242012 A1 | 12/2019 |

OTHER PUBLICATIONS

Extended European Search Report for EP 25168156.5 dated Sep. 1, 2025, 6 pgs.

* cited by examiner

*Primary Examiner* — Kristy A Haupt
(74) *Attorney, Agent, or Firm* — Foley & Lardner LLP

(57) ABSTRACT

A system and method for projecting coherent light with reduced diffraction pattern may include a coherent illumination source, structure with an aperture, and focusing lens. The focusing lens may have an object plane defined between the illumination source and structure, such that an illumination signal, such as an indication signal (e.g., green spot, aiming signal, etc.) that is projected through the aperture and onto an image plane does not exhibit a noticeable diffraction pattern, thereby having sharper edges and more perceptible to a user of a system that performs the projection of coherent light. The focusing lens may be in front of, at, integrated with, or behind the structure with the aperture, but the object plane remains between the coherent illumination source and structure with the aperture.

20 Claims, 6 Drawing Sheets

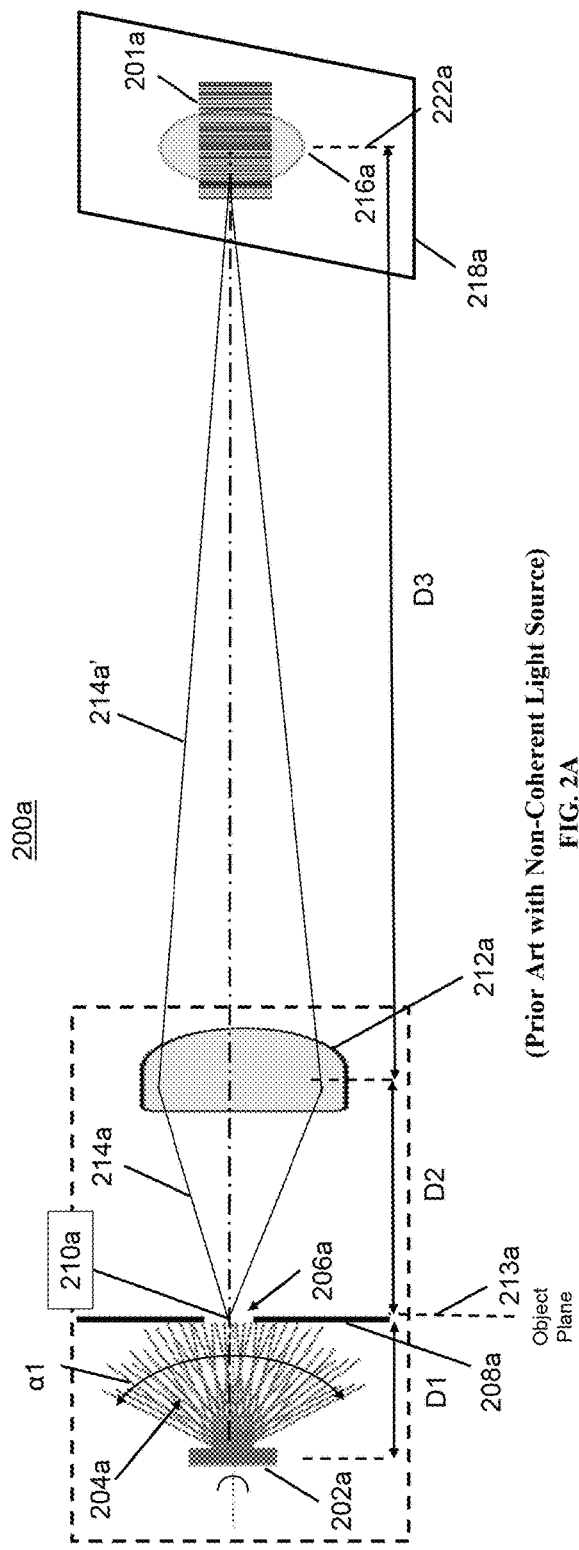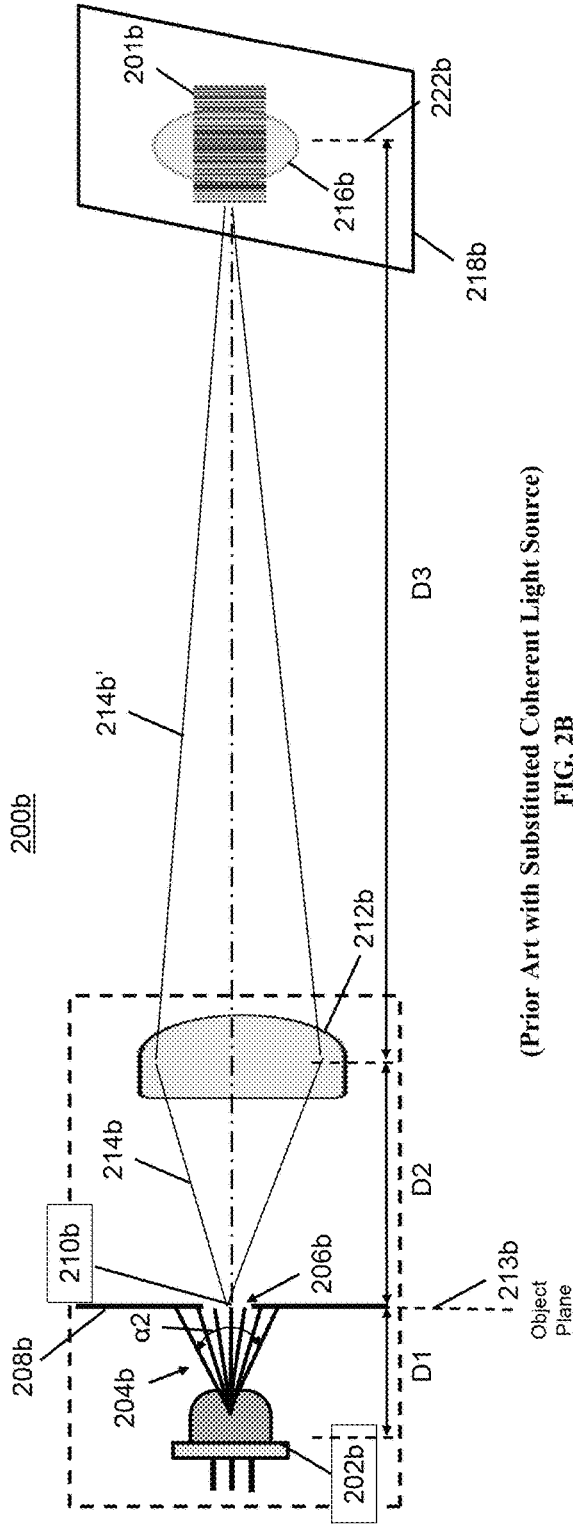

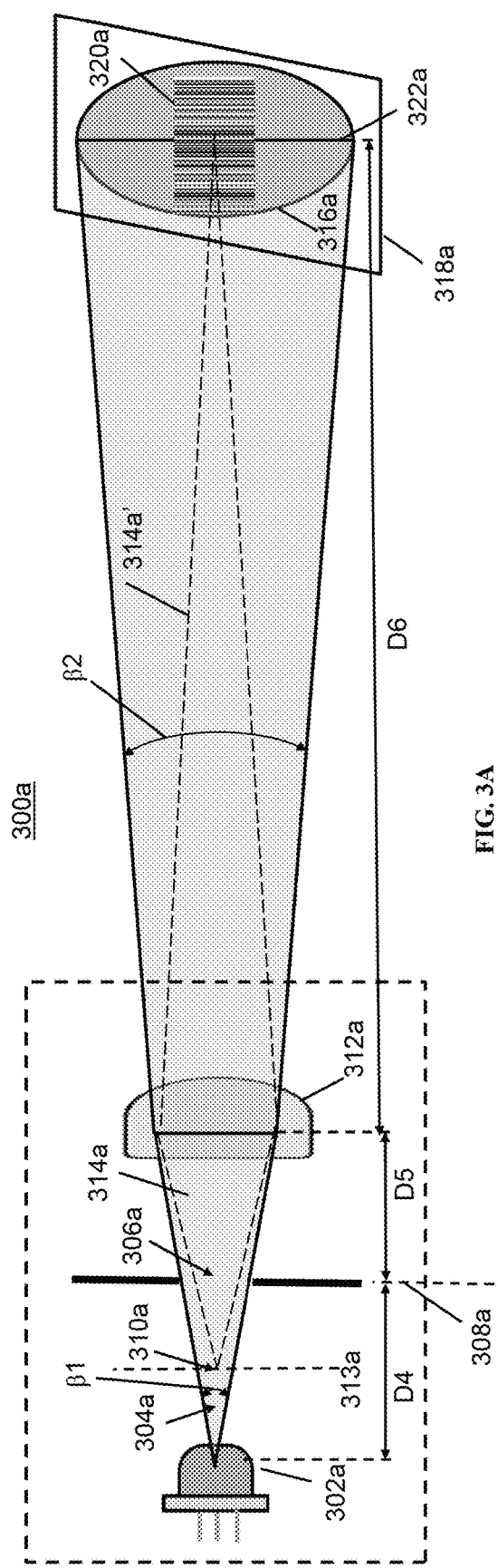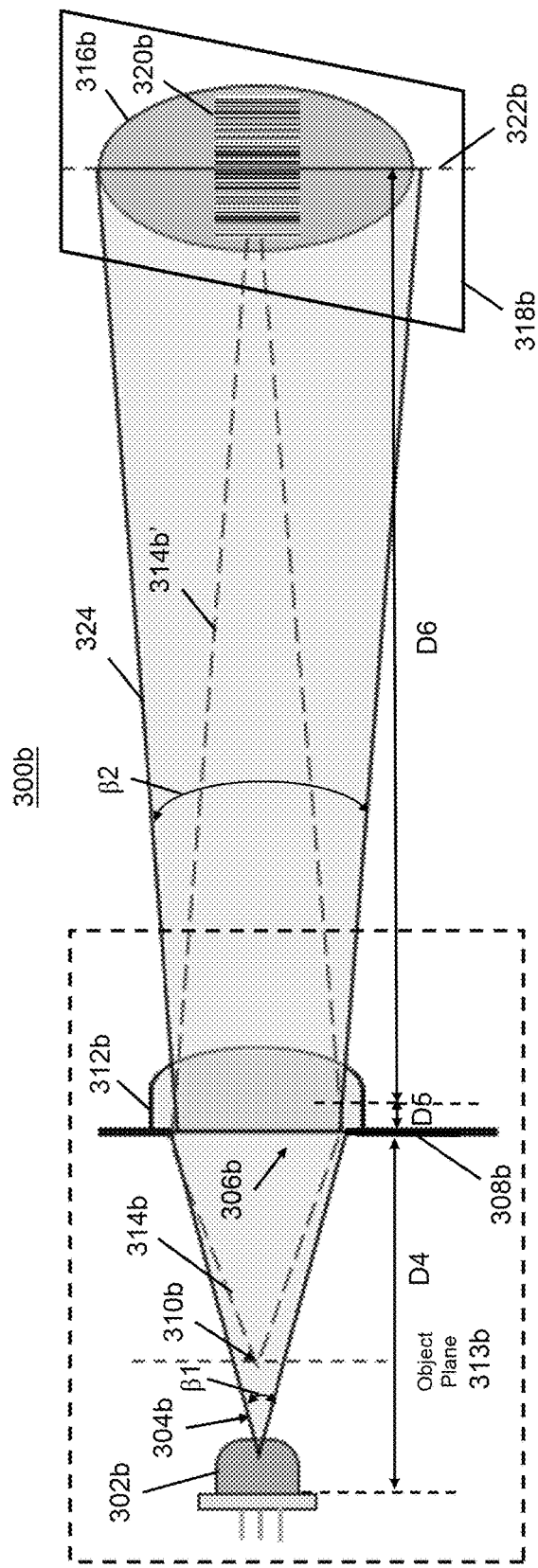
FIG. 3A
FIG. 3B

PROJECTION OF LASER LIGHT SIGN WITH REDUCED DIFFRACTION PATTERN

BACKGROUND

Barcode readers and mobile computers that are configured to read machine-readable indicia (e.g., barcodes, QR codes, or any other machine-readable codes) often have indicators that notify a user that the barcode reader successfully read and decoded a machine-readable indicia or facilitate an aiming illumination signal (e.g., spot) on the machine-readable indicia. The indicators may include lights (e.g., red/green light emitting diode (LED)) on the barcode reader, audible notification (e.g., tones) for good or bad reads of a machine-readable indicia, haptic signals (e.g., vibration), and so on. One such popular barcode reader utilizes a "green spot" indicator that projects a green spot from the reader onto a machine-readable indicia that was successfully read and decoded. The green spot indicator is highly effective in notifying a user because the visual confirmation where a user is actually looking when using the reader. Moreover, the use of the green spot indicator allows for silent mode operation that is effective use in both quiet environments (e.g., hospitals, libraries, etc.) and in noisy environments (e.g. manufacturing floor, warehouse/distribution centers, outdoors, grocery stores, etc.).

Consider the case where the light source implemented for spot indicators (e.g., green spot, aiming spot, or other function or shape) is constituted by a light-emitting diode (LED), emitting Lambertian-distributed light or diffused light that is non-coherent, that shines through a circular aperture that is imaged by a single lens. Because of inefficiencies of the light projection system (see FIG. 2A, for example), at distance (e.g., greater than 1 meter), the brightness is weak, thereby making the spot indicator either difficult or often impossible to see by a user, especially in bright ambient conditions. If a scan distance beyond 1 m is desired and a spot indicator is to be used, the dimension of the spot needs to shrink to increase brightness or enlargement of the focal length of the lens is needed. However, there are physical constraints due to miniaturization efforts that have been made over the years to reduce the size of barcode readers, which, of course, limits physical size and optical performance of the spot indicators. Simply replacing the LED with an alternative light source would result in a similar problem and potentially results in diffraction patterns or effects. Diffraction effects are not only unpleasant to view for the user because a projected circle ends up looking like a blob or non-circular shape (see FIG. 4A, for example). Accordingly, there is a need to create an optical projection system solution that produces a spot indicator with reduced or no diffraction effects, produces a significantly brighter at significantly longer ranges, and that is able to fit within a limited physical space of handheld and non-handheld barcode readers.

BRIEF SUMMARY

To overcome the shortcomings of spot indicators that have diffraction effects and limited range of visibility (e.g., less than 1 m), an optical system that images a cross-section of a light cone defined by a divergence angle of a laser beam produced by a laser diode or other coherent light source and subtended by a circular aperture positioned between the laser diode and an imaging lens is introduced. In an embodiment, a laser diode that emits light at a wavelength of around 510 nm or other wavelengths may be utilized. Laser diodes produce coherent light emitted in a narrow emission angle, while LEDs produce incoherent light emitted in a wide emission angle, thereby producing less bright light when projected through the aperture. Moreover, the principles described herein, enable a shorter optical device (e.g., barcode reader) by optimizing a distance between the emission point of the laser, aperture defined by a structure, and imaging lens. As provided herein, placement of the imaging lens with respect to the aperture may vary while maintaining an object plane of the imaging lens between the coherent light source and the aperture.

One embodiment of a system may include a coherent light source. A structure defining an aperture may be disposed in optical alignment with and at a first distance from the coherent light source so that a divergent angle of coherent light output by the coherent light source is incident the structure and aperture. An imaging lens may be disposed in optical alignment with the aperture defined by the structure. The imaging lens may be configured to focus the coherent light onto an image plane located at a second distance from the imaging lens. The imaging lens may be disposed at a third distance from the structure to focus an object plane defined by the imaging lens. The object plane may be located between the coherent light source and the structure.

One embodiment of a method of displaying an indicator light may include emitting, by a coherent light source, a coherent optical signal. The coherent optical signal may be directed toward an aperture defined by a structure. The coherent optical signal as established at an object plane of an imaging lens may be focused onto an image plane of the imaging lens. The object plane is located between the coherent light source and the structure.

BRIEF DESCRIPTION OF THE FIGURES

Illustrative embodiments of the present invention are described in detail below with reference to the attached drawing figures, which are incorporated by reference herein and wherein:

FIGS. 2A and 2B are illustrations of optical schematics of prior art optical projection systems configured with (i) a non-coherent light source and (ii) a coherent light source in place of the non-coherent light source to project respective optical indicators (e.g., green spots) in response to a barcode reader successfully or unsuccessfully reading a machine-readable indicia or other optical indicator (e.g., aiming light);

FIG. 3A-3D are illustrations of illustrative optical projection systems configured with coherent illumination sources and object planes between the coherent illumination sources and aperture defined by a structure positioned in front of the respective coherent illumination sources;

DETAILED DESCRIPTION

Figure 1:
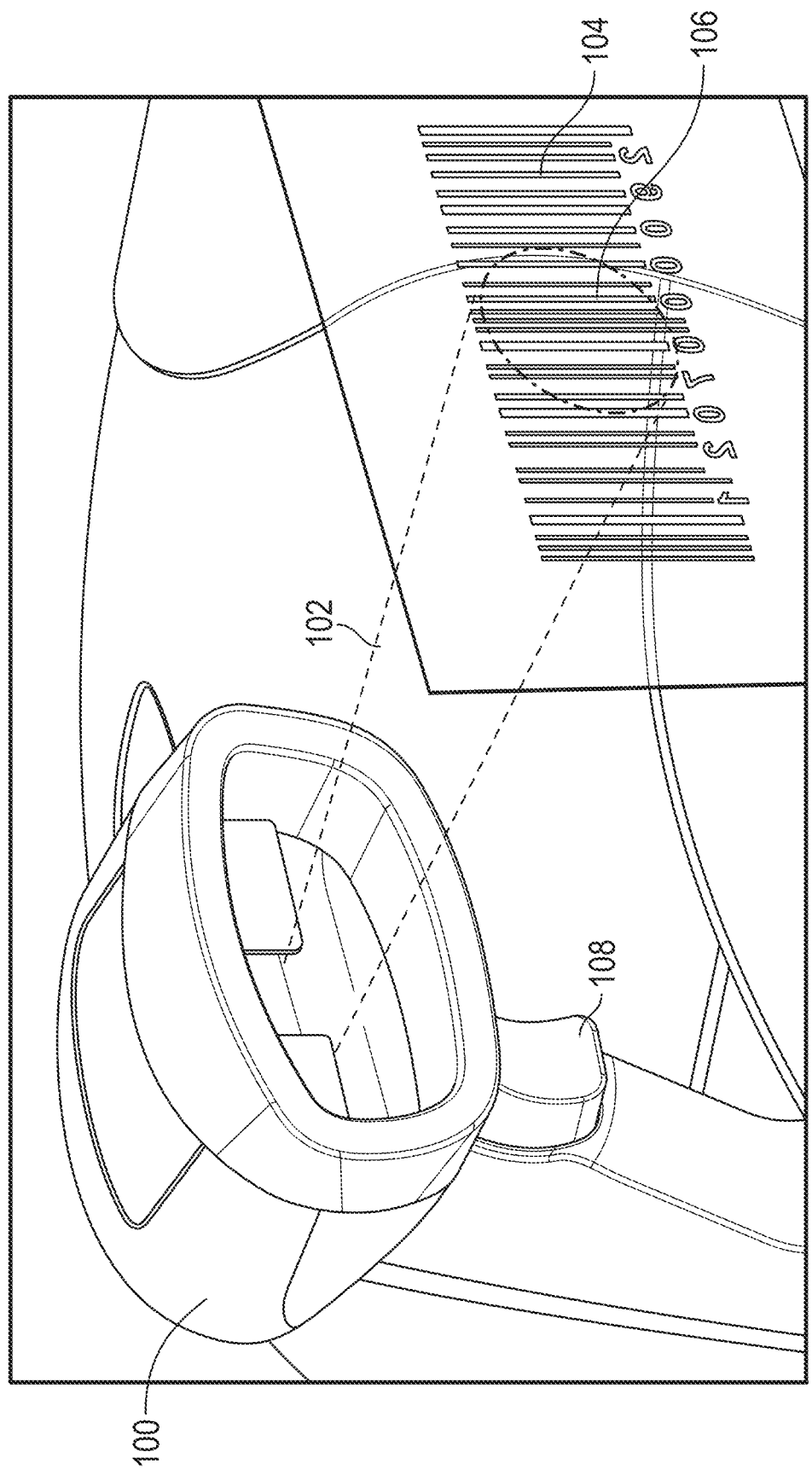
FIG. 1 is an illustration of an illustrative code reader configured with an optical projection system that outputs an optical signal to illuminate a machine-readable indicia with a light spot (e.g., green spot) in response to successfully reading and decoding of the machine-readable indicia or to facilitate an illumination aiming signal to aid a user in pointing the code reader to the machine-readable indicia.

With regard to FIG. 1, an illustration of an illustrative barcode reader 100 configured with an optical projection system (not shown) that outputs an indicator optical signal 102 to illuminate a machine-readable indicia 104 with a light spot 106 (e.g., a "good read" (green) light spot) in response to successfully reading and decoding of the machine-readable indicia 104 is shown. The principles described herein may further be utilized as an aiming light source to a target object (e.g., the machine-readable indicia 104) to assist a user in properly aiming the barcode reader 100 or other system. The indicator optical signal 102 may be displayed in one of multiple colors, such as (i) green in response to the machine-readable indicia 104 being successfully read and decoded, and (ii) red in response to the machine-readable indicia 104 being unsuccessfully read and decoded. Other colors and/or lighting patterns (e.g., flashing light spot from an ON to an OFF state and vice versa) may be utilized to convey other messages or notifications. The barcode reader 100 may include a trigger or other feature 108 that a user activates (e.g., pulls to a certain distance) to initiate reading the machine-readable indicia 104, which, if successfully read and decoded, causes the indicator optical signal 102 to be generated to project the light spot 106 thereon. The trigger 108 may be configured to be pulled to a first distance to produce an aiming light (e.g., plus sign), and a second distance to perform the reading or scanning of the machine-readable indicia 104.

As understood, conventional barcode readers with an indicator optical signal that is projected on machine-readable indicia being read have limited ranges (e.g., about 1 m) for the light spot to be visible by a user of the barcode reader because of inefficiencies of the optical projection system. The inefficiencies may include that much of incoherent light output by an LED does not pass through an aperture. However, the principles described herein may project visible light spots at significantly longer distances due to improving efficiency of the optical projection system. The barcode reader 100 is shown to be a handheld barcode reader, but it should be understood that the principles described herein may be applied to handheld and non-handheld barcode readers (e.g., fixed position barcode readers). Moreover, the principles described herein may be applied to system that are not barcode readers, but project light beams that may be used for a wide variety of purposes, such as signs, notifications, etc. In addition, the principles described herein may be utilized for an aiming system that provides an operator with a visual indication of a framed (or other) area in order to allow the barcode reader 100 or other system to be properly positioned over or directed at the area that includes the information to be read or otherwise image captured. In an embodiment, an aiming system may project an aiming pattern that facilitates the operator pointing the reader over an area that includes the machine-readable indicia to be read.

With regard to FIGS. 2A and 2B, illustrations of optical schematics of prior art optical projection systems configured with (i) a non-coherent illumination source and (ii) a coherent illumination source in place of the non-coherent light source to project respective optical indicators (e.g., green spot) in response to a barcode reader successfully or unsuccessfully reading a machine-readable indicia or other optical indicator (e.g., aiming light) are shown. With regard to FIG. 2A, the conventional optical projection system 200a includes a non-coherent illumination or equivalently light source, such as a light emitting diode (LED) 202a, configured to illuminate and output a non-coherent optical signal 204a. The optical signal 204a output by the LED 202a has a divergent angle or wide emission angle $\alpha 1$ that is greater than 90 degrees, and generally about 120 degrees. An aperture 206a defined by a structure or wall 208a may be disposed directly in front of the LED 202a at a distance D1, which may be less than about 1 millimeter (mm). The aperture 206a is generally about 0.6 mm in diameter when molded.

The conventional optical projection system 200a may further include a focusing or imaging lens 212a disposed at a distance D2 from and in optical alignment with the aperture 206a, which is at an object plane 213a of the imaging lens 212a. The imaging lens 212a has an object point 210a positioned at the aperture 206a. The imaging lens 212a focuses the non-coherent optical signal 214a so as to be an indicator optical signal 214a' that forms an image of the object point 210a on a spot 216a that is incident on a surface 218a on which a machine-readable indicia 201a is positioned at a distance D3 from the imaging lens 212a on an image plane 222a. The non-coherent optical signals 214a and 214a' are virtual cones that describe image construction, where the imaging lens 212a generates an image point from the object point 210a at the image plane 222a, and every object point at the object plane 213a may have a corresponding image point at the image plane 222a. Moreover, the cones may be of any angle.

The spot 216a may indicate to a user that the barcode reader has successfully read and decoded the machine-readable indicia 201a or unsuccessfully read and decoded the machine-readable indicia 201a or facilitate an aiming illumination signal. The spot 216a may be a 5 cm diameter circle at a distance of about 1 m and a smaller diameter below about 1 m distance from the barcode reader. However, because the non-coherent optical signal 204a is non-coherent light with a wide emission angle $\alpha 1$ that extends onto the wall 208a around the aperture 206a, the amount of energy contained in the indicator optical signal 214a' is limited such that the spot 216a is visible at a limited distance from the barcode reader (e.g., not visible at about 1 m distance or farther). Moreover, if the LED is substituted by a coherent light source (e.g., laser diode), as shown in FIG. 2B, diffraction effects occur such that the spot 216a is not particularly pleasing to a user (see, for example, FIG. 4A). With a dimension (distance between the conventional LED 202a and the apex of the imaging lens 212a) of 20 mm, a spot diameter of 3 cm at 50 cm from the imaging lens 212a is achieved. However, long range barcode reading engines that can read up to 20 m have been developed, but those reading engines cannot benefit from projecting a spot because a user of the barcode reader cannot visually see the spot much beyond 1 m.

There are two ways to create a smaller diameter spot at the same distance or get an acceptable diameter of the spot at longer distances, including (i) increasing the focal length of the imaging lens 212a or (ii) decreasing the diameter of the aperture 206a. However, both options are respectively limited by the required compactness specification of the optical projection system of the barcode reader and the efficiency (ratio between the amount of light shining on the aperture and the total emitted light) of the system. Hence, neither way is a viable solution in reducing the diameter of the spot indicator. As provided above (and shown in FIG. 2B), simply replacing the non-coherent light source 202a with a coherent light source with an object plane of the image lens 212a at the aperture 206a results in a light spot with diffraction effects (see FIG. 4A).

With regard to FIG. 2B, a prior art optical projection system 200b in which a coherent illumination source (e.g., laser diode) 202b replaces the non-coherent light source 202a of FIG. 2A. The coherent illumination source 202b outputs a coherent optical illumination signal 204b. The aperture may be 0.5 mm in diameter, for example. An object point 210b of an imaging lens 212b on an object plane 213a is set at the aperture 206b, and thereafter, a coherent optical illumination signal 214b formed as a cone and is incident on the imaging lens 212b. The imaging lens 212b focuses the coherent optical signal 214b so as to be an indicator optical signal 214b' also in the shape of a cone that forms an imaged point of the object point 210a on a spot 216b that is incident on a surface 218b on an image plane 222b. Focal length of the imaging lens 212b may have a focal length of 10 mm with an optical efficiency of 25%. The coherent optical signals 214b and 214b' are virtual cones that describe image construction, where the imaging lens 212b generates an image point at the image plane 222b from the object point 210b, and every object point at the object plane 213b may have a corresponding image point at the image plane 222b. As a result of the object plane 213b being collocated with the aperture 206b, the spot 216b on the image plane 222b is diffracted, such that a diffraction pattern is visible on the spot 216b, as shown in FIG. 4A, which makes the spot 216b non-aesthetically pleasing and potentially less visible to a user. Moreover, as a result of the object plane 213b being positioned at the aperture 206b, total length of the optical projection system 200b does not meet the requirements for miniaturization of the system since the aperture size needed to project a spot with same dimension in a miniaturized system given that shorter focal length and/or smaller aperture dimensions are required and there is a physical limit in the minimum aperture size that can be manufactured.

Figure 3C:
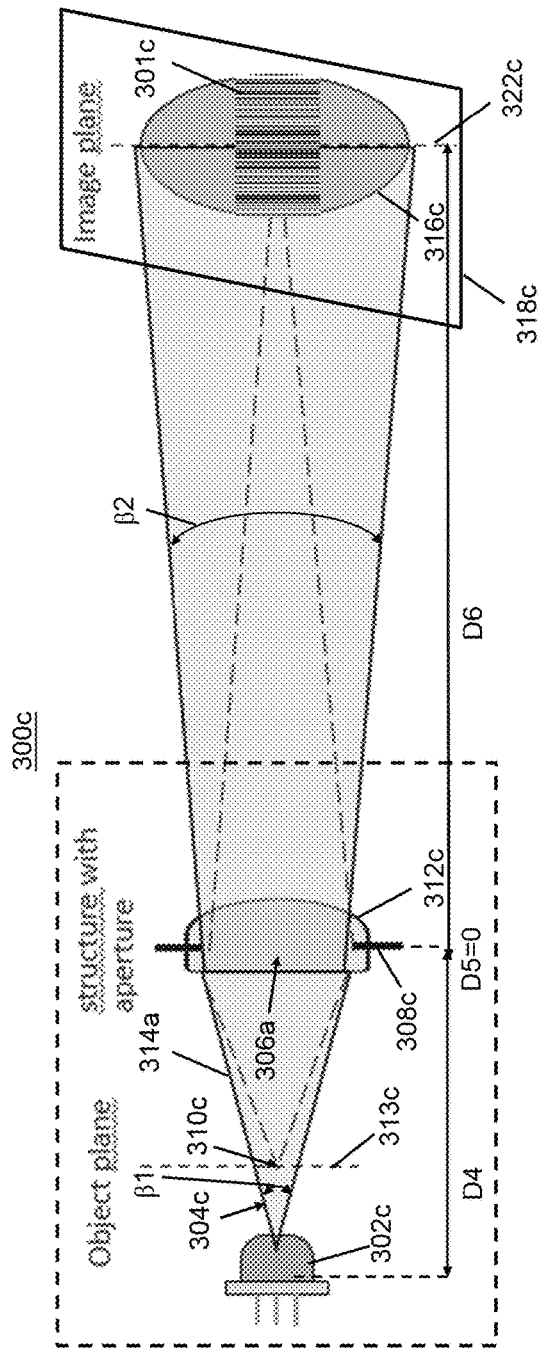

With regard to FIG. 3A, an illustration of an illustrative optical projection system 300a includes a coherent light source 302a, such as a laser diode, configured to output a coherent optical signal 304a is shown. The coherent optical signal 304a output by the coherent illumination source 302a has a narrow emission angle ($\alpha 2$ of FIG. 2B) (e.g., about 10 degrees, about 20 degrees, or any other narrow angle consistent of a coherent illumination source). An aperture 306a defined by a structure or wall 308a may be disposed directly in front of the coherent illumination source 302a at a distance of D4 about 3 mm to about 4 mm. Other distances may be possible. The aperture 306a may be circular and about 0.5 mm in diameter, but other shapes and dimensions may be utilized. Distance D5 is the distance between the structure 308a and the lens mid-point, defined as the half of the thickness of the lens 312a. The distance D5 is shorter than the distance D2 (FIGS. 2A and 2B) such that a length of the optical projection system 300a is shorter than that of the conventional optical projection system 200a. In an embodiment, the wavelength of coherent light may be about 510 nm (e.g., 510 nm+/−5%). Other wavelengths may be utilized, as well. As an example, the coherent illumination source 302a may be configured to emit a green wavelength and/or a red wavelength for notifying a user whether a machine-readable indicia is properly or improperly read and decoded. Similarly, if the optical projection system 300a is used as an aiming signal, then the aiming signal may be output light of any shape and wavelength utilizing a configuration of any of FIGS. 3A-3D.

The optical projection system 300a may further include an imaging lens 312a disposed at a distance D5 from, and in optical alignment with, the aperture 306a. An object point 310a located at an object plane 313a of the imaging lens 312a may be prior to the aperture 306a. To overcome the diffraction effects due to the coherent optical signal 204b of the coherent illumination source 202b when the object plane is at the structure 208b of FIG. 2B, the object point 310a imaged by the imaging lens 312a is constituted by a section of coherent optical signal 304a shaped as a cone (i.e., a divergent angle $\beta 1$) that is well-defined by the aperture 306a. The object point 310a may be established on the object plane 313a of the imaging lens 312a located anywhere between about 10 percent and about 90 percent of the distance from the coherent illumination source 302a and aperture 306a. As such, the imaging lens 312a may have alternative configurations and/or positions or relative positions than shown. However, specifications, such as length, of the optical projection system 300a may limit the location of the object point 310a. The coherent optical signal 304a exits the aperture 306a as coherent optical signal 314a and is incident on the imaging lens 312a. The imaging lens 312a focuses the object point 310a through the coherent optical signal 314a by an indicator optical signal 314a' that forms a point on a spot 316a that is incident on a surface 318a on which a machine-readable indicia 320a is positioned a distance D6 from the imaging lens 312a on an image plane 322a.

The spot 316a is defined by a shape of the aperture 306a, and may indicate to a user that the barcode reader has been successfully read and decoded the machine-readable indicia 320a or unsuccessfully read and decoded the machine-readable indicia 320a. The spot 316a may be about a 5 mm diameter circle (e.g., 5 mm+/−10%) at a distance of about 50 cm (e.g., 50 cm+/−10%) from the imaging lens 312a. In an embodiment, the light spot 316a may have a diameter of 3 cm at a distance of 2 m from the coherent light source 302a. It should be understood that alternative sizes of spots may be utilized based on alternative dimensions and shapes of the aperture 306a. The location of the object plane 313a defines, in part, the size of the light spot 316a. Moreover, the aperture 306a may have different sizes and/or shapes (or even be a variable size or shape) so that the spot 316a has a corresponding different size and/or shape.

Because the coherent optical signal 304a is coherent light with a narrow emission angle, the amount of energy contained in the indicator optical signal 314a' generates the spot 316a that is brighter and is visible at significantly longer distances (e.g., 20 m) than use of a non-coherent illumination source (see FIG. 2A). And, because the spot 316a is formed by a projection of object points 310a (and other object points) from the object plane 313a prior to the aperture 306, the spot 316a has sharp edges and does not exhibit a noticeable diffraction pattern (see, for example, FIG. 4B). Because the spot 316a has sharp edges, a user may find the spot visually pleasing, brighter, and easier to identify in most ambient lighting conditions. Moreover, as a result of the object plane 313a being positioned prior to the aperture 306a and the imaging lens 312a having a shorter focal length than the one of the imaging lens 212b of FIG. 2B, total length of the optical projection system 300a may be 7 mm or other shortened overall length (as compared to 15 mm of the optical projection system 200b of FIG. 2B).

In summary, the object plane is positioned between the light source 302a and the aperture 306a. A cross-section of the cone at the object plane 313a is thus smaller (i.e., the object is smaller) than the aperture size. To obtain the same spot dimension at the same image plane, a lens with a smaller focal length may be used, thereby obtaining a shorter projection system. Alternatively, with a focusing lens having the same focal length, a smaller spot diameter may be obtained.

With regard to FIG. 3B, an illustration of an alternative illustrative optical projection system 300b includes a coherent illumination source 302b configured to output a coherent optical signal 304b is shown. The optical signal 304b is in the shape of a cone as it approaches an aperture 306b of a wall or structure 308b located a distance D4 from the coherent illumination source 302b. In this case, an object point 310b is disposed prior to both the aperture 306b and an imaging lens 312b that are essentially at the same distance D4 from the coherent illumination source 302b. In an embodiment, the structure 308b and imaging lens 312b may be attached to one another through an adhesive or other bonding (e.g., co-molding) or attachment (e.g., bracket-mounted). In this case, the distance D5 coincides with the distance between the surface of the lens 312b facing the illumination source 302b and the mid-point of the lens 312b. Therefore, the structure 308b is attached to the surface of the lens 312b facing the coherent illumination source 302b. An object plane 313b is disposed between the illumination source 302b and aperture 306b. A coherent optical signal 314b that passes through the imaging lens 312b becomes coherent optical signal 314b', which is applied to a spot 316b on a surface 318b on which a machine-readable indicia 320b on the surface 318b is positioned a distance of D6 from the imaging lens 312b on an image plane 322b. The spot 316b is defined by the aperture 306b, which in this case is circular, as depicted by light cone 324. Each of the cones of the optical signal 304b into and out of the aperture 306b may be defined by respective angles $\beta_1$ and $\beta_2$. Alternative shapes and/or angles of the aperture 306b may be utilized. It should be understood that the figures are not to scale and that the dimensions in FIGS. 3A-3D may vary amongst one another.

With regard to FIG. 3C, an illustration of yet another illustrative optical projection system 300c that includes a coherent illumination source 302c configured to output a coherent optical signal 304c via an aperture 306c is shown. In this case, a structure 308c and imaging lens 312c are integrated (e.g., co-molded) such that an object point 310c on an object plane 313c is imaged via the imaging lens 312c onto an image plane 322c of a surface 318c on which a machine-readable indicia 301c is positioned such that a spot 316c is displayed thereon. Distance D5 between the structure 308c and the mid-point of the imaging lens 312c may be considered zero.

Figure 3D:
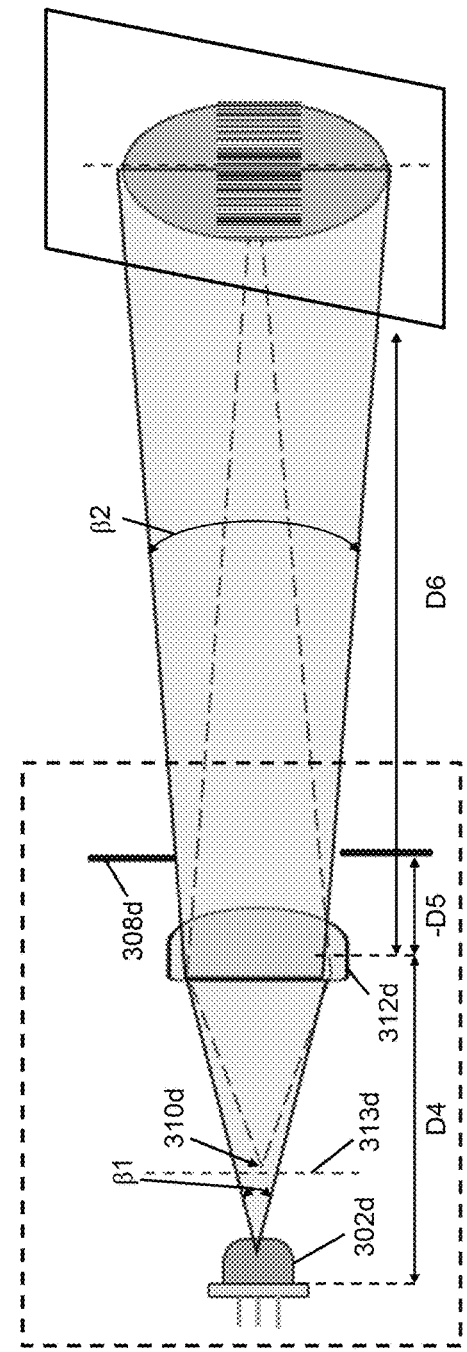

With regard to FIG. 3D, an illustration of yet another illustrative optical projection system 300d includes a coherent illumination source 302d configured to output a coherent optical signal 304d is shown. In this case, a structure 308d is disposed behind an imaging lens 312d. An object point 310d is located on an object plane 313d between the coherent illumination source 302d and the imaging lens 312d. Distance D5 may be considered a negative distance as the imaging lens 312d is closer to the coherent illumination source 302c than the structure 312c. Other features and functions of the optical projection system 300d are the same or similar to those of FIGS. 3A-3C, as described hereinabove. Although FIGS. 3A-3D are demonstrating the principles of forming an object plane between a coherent illumination source and an aperture of a structure for use in projecting a spot (or other shape(s)) on a machine-readable indicia, the principles described herein with regard to placement of the object plane between a coherent illumination source and an aperture of a structure may be utilized for many other projection systems and applications thereof.

Figure 4B:
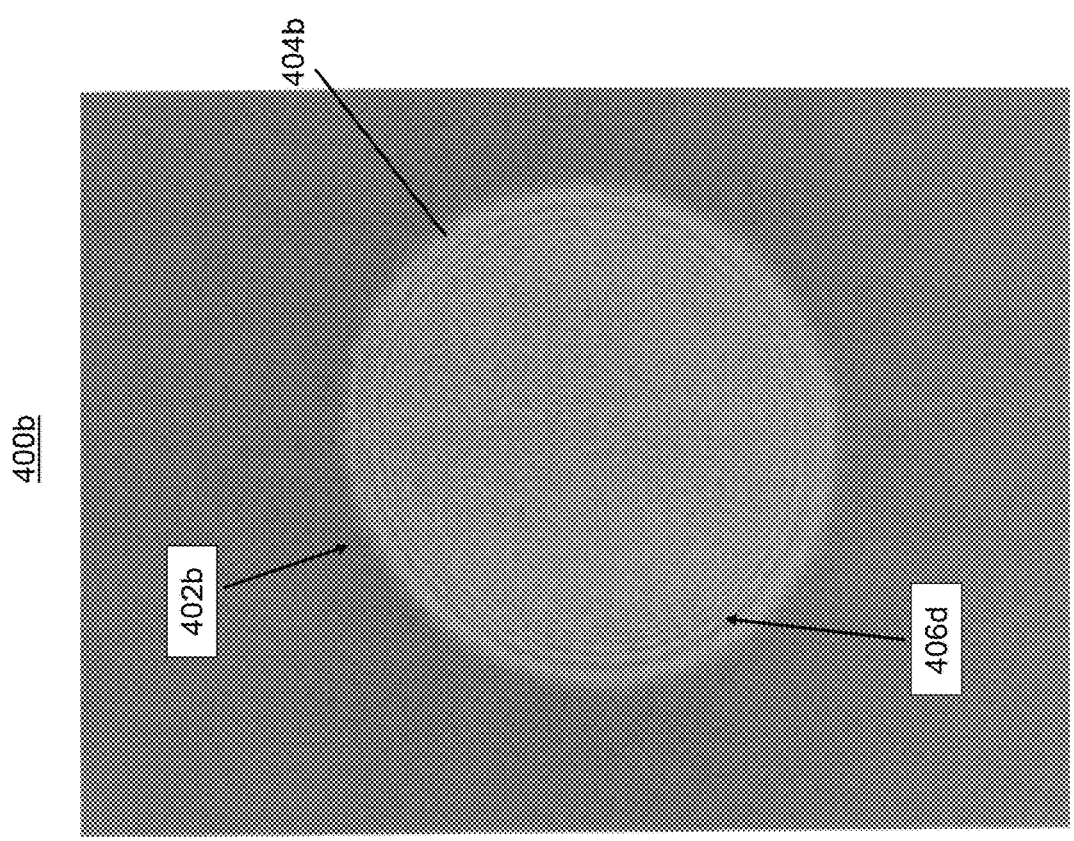
FIG. 4B is an illustration of an illustrative spot without noticeable diffraction patterns capable of being produced by any of the optical projection systems of FIG. 3A-3D.
Figure 4A:
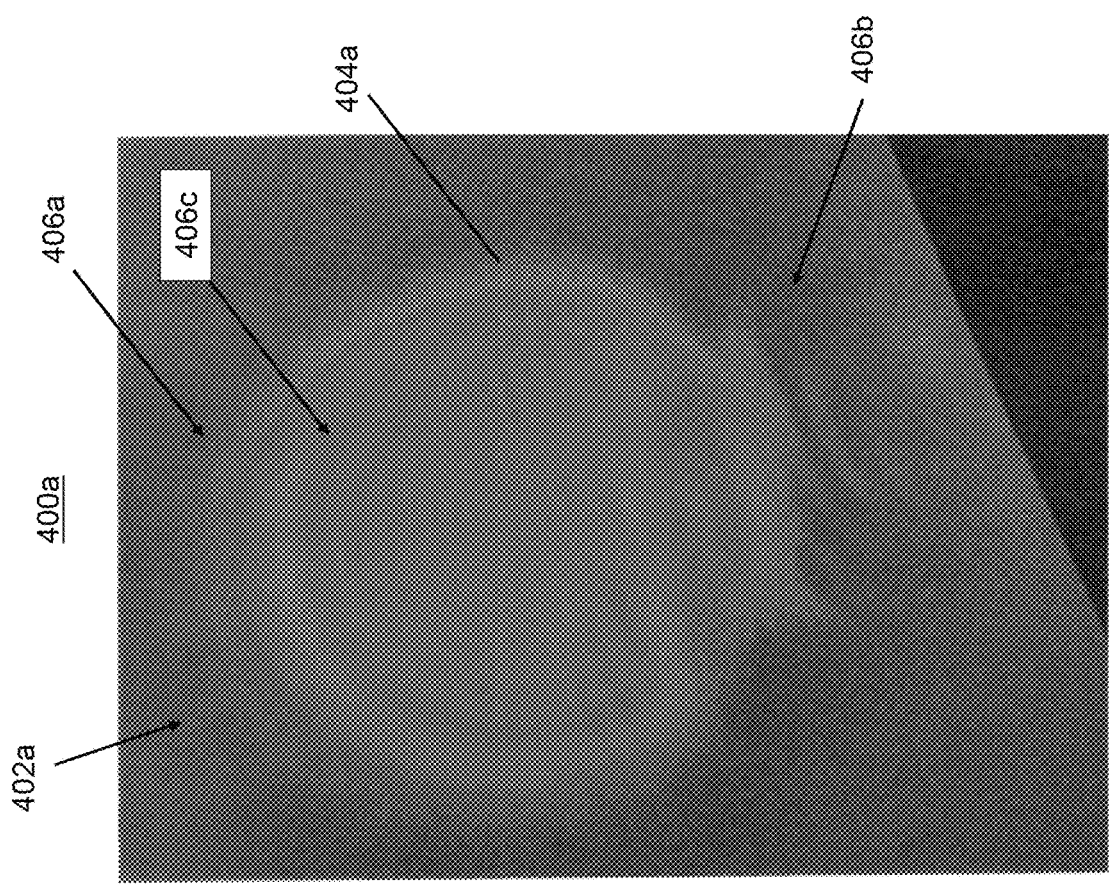
FIG. 4A is an illustration of an illustrative spot, such as a green spot, with diffraction patterns produced by an optical projection system utilizing the configuration of FIG. 2B with a coherent illumination source (e.g., laser source) in replace of a non-coherent illumination source (e.g., LED) of FIG. 2A with an object plane of a focusing lens set at an aperture of a structure positioned in front of the coherent illumination source.

With regard to FIGS. 4A and 4B, illustrations of scenes 400a and 400b showing respective indicator spots or spots 402a and 402b (e.g., green spots) produced by (i) the conventional optical projection system 200b with a coherent light source and object plane at an aperture at a structure of FIG. 2B and (ii) any of the optical projection systems 300a-300d (collectively 300) having a coherent light source and object plane prior to an aperture at a structure of FIGS. 3A-3D are shown. The spot 402a and an edge 404a thereof is shown to include a number of distortion areas, such as a fuzzy edge region 406b, diffusion pattern 406a along the edge 404a of the spot 402a, and diffraction pattern 406c within spot 402a. By contrast, the spot 402b is shown to be much more solid (i.e., the color is more evenly distributed and denser throughout the spot 402b) than that of the spot 402a. The edge 404b of the spot 402b is much more sharp than the edge 404a of the spot 402a. There is a slight diffraction pattern 406d (e.g., diffraction rings on the projected spot 402a) within the spot 402b, but the diffraction pattern 406d is formed of much narrower rings than that of the diffraction pattern 406c of the spot 402a. The diffraction pattern 406d is due to the spatial coherence of laser light, which may be limited by optimizing the distance between the emission point of the laser diode, aperture of the structure, and imaging lens.

Figure 5:
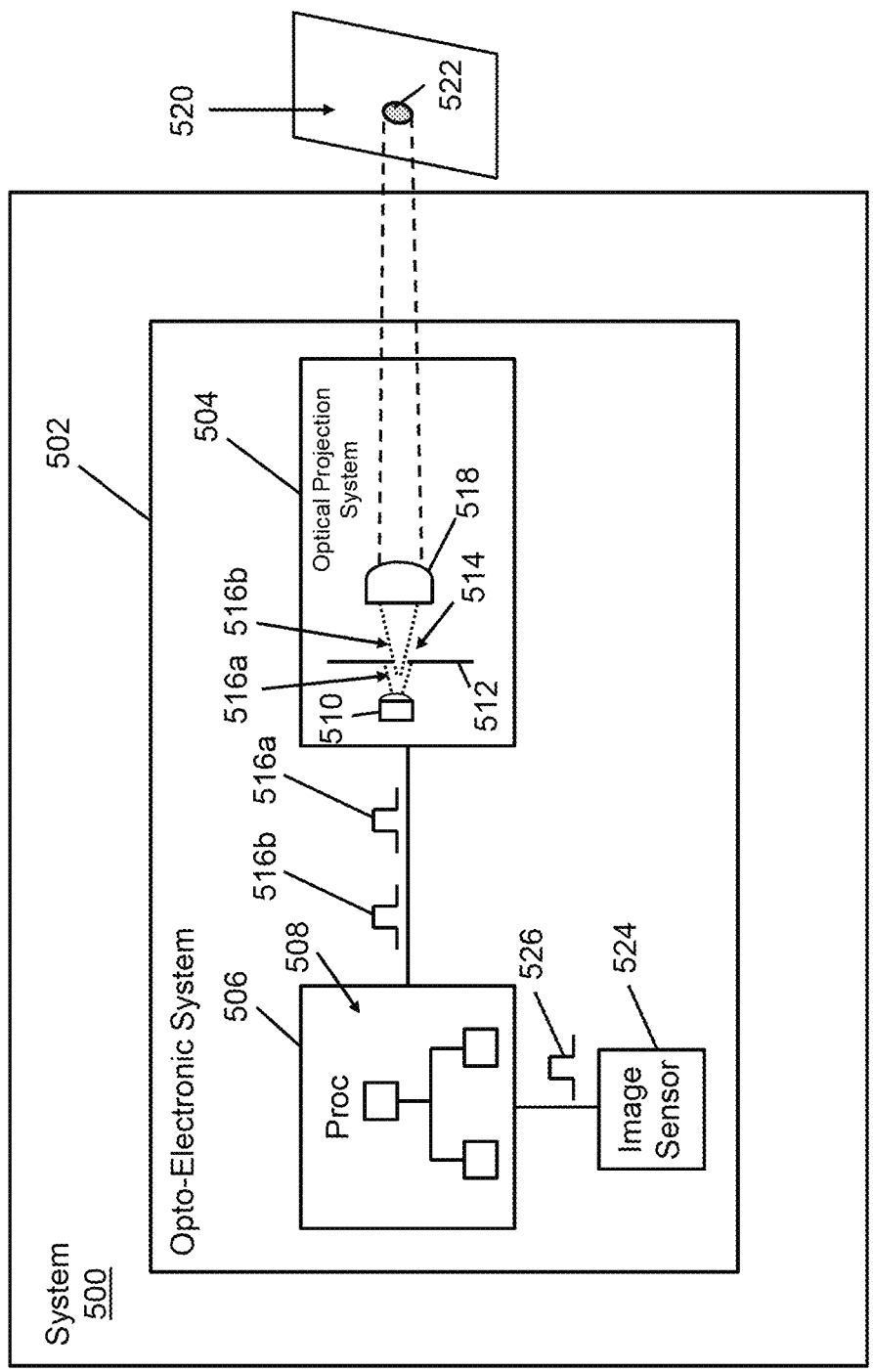
FIG. 5 is a block diagram of an illustrative electronics system of a barcode reader inclusive of any of the optical projection systems of FIGS. 3A-3D.

With regard to FIG. 5, a block diagram of an illustrative system 500, such as a barcode reader, inclusive of optoelectronics 502 inclusive of an optical projection system 504, such as shown in FIG. 3A, is shown. The optoelectronics 502 may include at least one processor 506 in communication with the optical projection system 504. The processor(s) 506 may be configured to execute software 508 that is used to perform functions to control the system 500, such as reading and decoding machine-readable indicia, determining whether the decoding was successful or unsuccessful, and cause an indicator spot to be illuminated by the optical projection system 504. An aiming function of the system 500 may utilize the optical projection system 504 or another optical projection system utilizing any of the configurations of FIGS. 3A-3D. Other functions, such as responding to an activation and deactivation of a trigger or otherwise by a user or automatically, may be performed by the software 508. In the case of the system not being a barcode reader, the software 508 may be configured to cause the processor(s) 506 to perform functions for that system in addition to controlling the optical projection system 304. The optical projection system 502 may include one or more laser diodes 510 that are aligned with an aperture and imaging lens, such as shown in FIG. 3A. In addition a structure 512 with an aperture 514 may be disposed in front of the laser diode(s) 510 such that a first portion or cone 516a of a coherent optical signal output by the laser diode(s) 510 is incident the structure 512 and a second portion 516b of the coherent optical signal exits the aperture 514. An imaging lens 518 may be aligned in front of the aperture 514 such that the second portion 516b of the coherent optical signal is incident the imaging lens 518. The imaging lens 518 may be positioned and configured to (i) have an object plane (see FIG. 3A) positioned between the laser diode(s) 510 and the structure 512 and (ii) focus the coherent optical signal to an image plane 520 to form a light spot 522 thereat.

An image sensor or imager 524 may be configured to capture an image of a scene at which the barcode reader is aiming, and generate image data 526 inclusive of a machine-readable indicia (e.g., barcode, QR code, dot part marking (DPM) code, and so on). The processor(s) 506 may receive the image data 526 from the image sensor 524, read the image data 526 (e.g., identify image data representative of the machine-readable indicia), and decode the image data 526 representative of the machine-readable indicia. It should be understood that additional and/or alternative electrical and electronic devices may be utilized to support various functions, including, but not limited to one or more image sensors, notification illumination devices, wireless communications devices, electrical connectors, rechargeable battery, and so on.

In an embodiment, the software 508 may be configured to perform barcode reading functions. For example, in response to successfully reading and decoding the machine-readable indicia, the processor(s) 506 may generate and communicate a first signal 516a to cause a first laser diode of the laser diode(s) 510 to turn ON (e.g., turn ON a green laser diode) to indicate that the scan of the machine-readable indicia was successful. In response to unsuccessfully reading and decoding the machine-readable indicia, as understood in the art, the processor(s) 506 may generate and communicate a second signal 516b to cause a second laser diode of the laser diode(s) 510 to turn ON (e.g., a red laser diode). In an embodiment, the first and second signals 516a and 516b may be the same signal (e.g., produced by the processor at different time and for different amounts of time), so as to cause electronics (not shown) to use one laser diode or another laser diode to turn ON or OFF. Alternative techniques to control one or more laser diodes may be utilized. If the first laser diode is capable of generating multiple colors (e.g., green and red), then the processor(s) 506 may be configured to cause (e.g., by sending the second signal 516b) the first laser diode to output a different color (e.g., red) from the successful color (e.g., green). In an alternative embodiment (e.g., if only a single laser diode is used), the processor(s) 506 may be configured to prevent the first laser diode turning ON (e.g., not producing an ON signal or maintaining the first laser diode in an OFF state) until a machine-readable indicia is successfully read and decoded or cause the first laser diode to flash in a pattern. Sounds and/or haptic feedback may additionally and/or alternatively be generated in response to an unsuccessful or successful read and decode of a machine-readable indicia.

System Features

One embodiment of a system may include a coherent light source. A structure defining an aperture may be disposed in optical alignment with and at a first distance from the coherent light source so that a divergent angle of coherent light output by the coherent light source is incident the structure and aperture. An imaging lens may be disposed in optical alignment with the aperture defined by the structure. The imaging lens may be configured to focus the coherent light an image plane located at a second distance from the imaging lens. The imaging lens may be disposed at a third distance from the structure to focus an object plane defined by the imaging lens. The object plane may be located between the coherent light source and the structure.

The third distance may be equal to zero or negative. The structure may be co-molded onto the imaging lens. The aperture may be circular, thereby resulting in a circular light spot being projected on the image plane. The circular light spot may have a diameter of about 10 mm at the image plane located a distance of 50 cm from the coherent light source or a circular light spot with a diameter of 40 mm at the image plane located a distance of 2 m from the coherent light source.

The object plane may be located between about 10 percent and 90 percent of the distance from the coherent light source to the structure. In an embodiment, the coherent light source is a laser diode. Electronics may be configured to activate the coherent light source in response to a user interacting with a feature to initiate an aiming signal. The coherent light source may produce a wavelength that is green. The wavelength may be about 510 nm.

The system may further include an image sensor configured (i) to capture light signals from a scene located at or in the same direction as the image plane, and (ii) to generate corresponding image data. At least one processor may be in electrical communication with the imager, and configured to (i) receive the image data, (ii) identify and process a machine-readable indicia disposed within a scene captured by the image sensor, where the machine-readable indicia is represented by the image data, and (iii) in response to successfully decoding the machine-readable indicia, cause the coherent light source to illuminate, otherwise, (a) prevent the coherent light source from illuminating, (b) cause the coherent light source to illuminate with a different color, or (c) cause the coherent light source to flash between an ON state and an OFF state.

The system may further include a trigger that, when activated by a user, enables the at least one processor to turn ON the coherent light source in response to successfully reading and decoding the machine-readable indicia, and when deactivated by the user, causes the at least one processor to turn OFF the coherent light source. In an embodiment, the aperture is circular and about 0.5 mm in diameter. The first distance may be between approximately 2 mm and approximately 20 mm, and the second distance may be between approximately 5 cm and approximately 20 m. The structure may be positioned a third distance in front of the coherent light source, where the third distance may be between approximately 0.2 mm and approximately 20 mm. Approximately may mean being within 5% or possibly as much as 10%.

One embodiment of a method of displaying an indicator light may include emitting, by a coherent light source, a coherent optical signal. The coherent optical signal may be directed toward an aperture defined by a structure. The coherent optical signal as established at an object plane of an imaging lens may be focused onto an image plane of the imaging lens. The object plane is located between the coherent light source and the structure.

Focusing the coherent optical signal as established at the object plane of the imaging lens onto an image plane of the imaging lens may include establishing the object plane between about 10 percent and about 90 percent of the distance between the coherent light source and the structure. The process may further include capturing images of light from a scene located at or in the same direction as the image plane, where the scene includes a machine-readable indicia. Image data inclusive of data representative of the machine-readable indicia may be generated. The machine-readable indicia represented by the image data may be decoded. In response to successfully decoding the machine-readable indicia, the coherent light source may be illuminated. Otherwise, the process may (i) prevent the coherent light source from illuminating, (ii) cause the coherent light source to illuminate with a different color, or (iii) cause the coherent light source to flash ON and OFF. In an embodiment, the coherent light source may be activated in response to a user interacting with a feature to initiate an aiming signal. Emitting a coherent optical signal may include emitting a coherent optical signal with a green color. Focusing the coherent optical signal may include focusing the coherent optical signal to an image plane located farther than 1 meter from the imaging lens.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The previous description is of a preferred embodiment for implementing the invention, and the scope of the invention should not necessarily be limited by this description. The scope of the present invention is instead defined by the following claims.

What is claimed is:

1. A system, comprising:
    a coherent light source;
    a structure defining an aperture disposed in optical alignment with and at a first distance from the coherent light source so that a divergent angle of coherent light output by the coherent light source is incident the structure and aperture; and
    an imaging lens disposed in optical alignment with the aperture defined by the structure, the imaging lens configured to focus the coherent light onto an image plane located at a second distance from the imaging lens, the imaging lens disposed at a third distance from the structure to focus an object plane defined by the imaging lens, the object plane located between the coherent light source and the structure.

2. The system according to claim 1, wherein the third distance is equal to zero.

3. The system according to claim 1, wherein the third distance is negative.

4. The system according to claim 1, wherein the structure is co-molded onto the imaging lens.

5. The system according to claim 1, wherein the aperture is a circular aperture, thereby resulting in a circular light spot being projected on the image plane.

6. The system according to claim 5, wherein the circular light spot has a diameter of about 10 mm at the image plane located a distance of 50 cm from the coherent light source or a circular light spot with a diameter of 40 mm at the image plane located a distance of 2 m from the coherent light source.

7. The system according to claim 1, wherein the object plane is located between about 10 percent and 90 percent of the distance from the coherent light source to the structure.

8. The system according to claim 1, wherein the coherent light source is a laser diode.

9. The system according to claim 8, wherein the coherent light source produces a wavelength that is green.

10. The system according to claim 1, further including electronics configured to activate the coherent light source in response to a user interacting with a feature to initiate an aiming signal.

11. The system according to claim 1, further comprising an image sensor configured (i) to capture light signals from a scene located at or in the same direction as the image plane, and (ii) to generate corresponding image data.

12. The system according to claim 11, further comprising at least one processor in electrical communication with the imager, and configured to:
    receive the image data;
    identify and process a machine-readable indicia disposed within a scene captured by the image sensor, the machine-readable indicia represented by the image data; and
    in response to successfully decoding the machine-readable indicia, cause the coherent light source to illuminate, otherwise, (i) prevent the coherent light source from illuminating, (ii) cause the coherent light source to illuminate with a different color, or (iii) cause the coherent light source to flash between an ON state and an OFF state.

13. The system according to claim 12, further comprising a trigger that, when activated by a user, enables the at least one processor to turn ON the coherent light source in response to successfully reading and decoding the machine-readable indicia, and when deactivated by the user, causes the at least one processor to turn OFF the coherent light source.

14. The system according to claim 1, wherein the aperture is circular and about 0.5 mm in diameter.

15. The system according to claim 1,
wherein the structure is positioned at a first distance in front of the coherent light source, wherein the first distance is between approximately 0.2 mm and approximately 20 mm; and
wherein the second distance is between approximately 5 cm and approximately 20 m, and wherein the third distance is between approximately 0.2 mm and approximately 20 mm.

16. A method of displaying an indicator light, said method comprising:
    emitting, by a coherent light source, a coherent optical signal;
    directing the coherent optical signal toward an aperture defined by a structure; and
    focusing the coherent optical signal as established at an object plane of an imaging lens onto an image plane of the imaging lens, the object plane located between the coherent light source and the structure.

17. The method according to claim 16, wherein focusing the coherent optical signal as established at an object plane of an imaging lens includes establishing the object plane of an imaging lens located between about 10 percent and about 90 percent of the distance between the coherent light source and the structure.

18. The method according to claim 16, further comprising:
    capturing images of light from a scene located at or in the same direction as the image plane, the scene including a machine-readable indicia;
    generating image data inclusive of data representative of the machine-readable indicia;
    decoding the machine-readable indicia represented by the image data; and
    in response to successfully decoding the machine-readable indicia, illuminating the coherent light source, otherwise, (i) preventing the coherent light source from illuminating, (ii) causing the coherent light source to illuminate with a different color, or (iii) causing the coherent light source to flash ON and OFF.

19. The method according to claim 16, further comprising activating the coherent light source in response to a user interacting with a feature to initiate an aiming signal.

20. The method according to claim 16, wherein focusing the coherent optical signal includes focusing the coherent optical signal to an image plane located farther than 1 meter from the imaging lens.

* * * * *